(12) United States Patent
Person et al.

(10) Patent No.: US 6,959,685 B2
(45) Date of Patent: Nov. 1, 2005

(54) ROTARY INTERNAL COMBUSTION ENGINE

(75) Inventors: Herman R. Person, 2722 30th St., Columbus, NE (US) 68601; Henry M. Person, Denton, NE (US)

(73) Assignee: Herman R. Person, Columbus, NE (US)

( * ) Notice: Subject to any disclaimer, the term of this patent is extended or adjusted under 35 U.S.C. 154(b) by 154 days.

(21) Appl. No.: 10/800,881

(22) Filed: Mar. 15, 2004

(65) Prior Publication Data
US 2004/0182356 A1 Sep. 23, 2004

Related U.S. Application Data

(63) Continuation of application No. 10/390,083, filed on Mar. 17, 2003, now Pat. No. 6,766,783.

(51) Int. Cl.$^7$ .......................... F02B 53/00; F01C 1/344
(52) U.S. Cl. ...................... 123/236; 123/235; 123/237; 418/13; 418/15; 418/150
(58) Field of Search ................. 123/231, 235, 123/236, 237, 205, 204; 418/210, 150, 13, 211, 15; F02B 53/00; F01C 1/344

(56) References Cited

U.S. PATENT DOCUMENTS

| | | | |
|---|---|---|---|
| 784,514 A | 3/1905 | Buchanan | 418/15 |
| 1,267,157 A | * 5/1918 | Zabriskie | 123/235 |
| 1,605,912 A | 11/1926 | Barker | 423/236 |
| 1,919,355 A | 7/1933 | Bancroft | 423/204 |
| 3,411,488 A | 11/1968 | Kratina | 123/235 |
| 3,716,033 A | * 2/1973 | Lepine | 123/235 |
| 3,726,259 A | 4/1973 | Graves | 423/236 |
| 4,009,573 A | 3/1977 | Satz | 418/13 |
| 4,154,208 A | 5/1979 | Kunieda et al. | 423/236 |
| 4,515,514 A | 5/1985 | Hayase et al. | 418/150 |
| 4,667,468 A | 5/1987 | Hansen | |
| 4,802,830 A | 2/1989 | Nakajima | 418/150 |
| 5,302,096 A | 4/1994 | Cavalleri | 418/150 |
| 5,937,820 A | 8/1999 | Nagata et al. | |

FOREIGN PATENT DOCUMENTS

| | | | |
|---|---|---|---|
| EP | 85427 A1 | 1/1983 | 123/237 |
| FR | 501 417 * | 4/1920 | F02B/53/00 |
| FR | 2 627 544 A1 * | 8/1989 | 123/236 |
| JP | 55 066601 A * | 5/1980 | 123/236 |
| WO | WO 99/04141 A1 * | 1/1999 | F01C/1/344 |

* cited by examiner

Primary Examiner—Thai-Ba Trieu

(57) ABSTRACT

A rotary internal combustion engine has a shaft, a compression chamber, an ignition chamber, a center wall, a first rotor, and a second rotor. The shaft is fixed to the rotors while being rotatably mounted to the compression and ignition chambers. The compression chamber has an oval shaped chamber wall and receives fuel and compresses the fuel. The ignition chamber has an oval shaped chamber wall and receives compressed fuel from the compression chamber and combusts the compressed fuel. The center wall is located between the compression chamber and ignition chamber and allows passage of compressed fuel from the compression chamber to the ignition chamber. The first rotor has a circular perimeter surface and is rotatably received within the compression chamber. The second rotor has a circular perimeter surface and is rotatably received within the ignition chamber.

12 Claims, 6 Drawing Sheets

ROTARY INTERNAL COMBUSTION ENGINE

CROSS REFERENCE TO RELATED APPLICATION

This application is a continuation of U.S. application Ser. No. 10/390,083, filed Mar. 17, 2003 now U.S. Pat. No. 6,766,783.

BACKGROUND OF THE INVENTION

Rotary engines provide simplified mechanics and can be made much smaller than a piston engine. However, existing rotary engines are still relatively complex, expensive to manufacture, and are often inefficient.

It is therefore a principal object of the inventor to provide a rotary engine that is efficient of manufacture and use, easily operated, easily maintained, comprised of a minimum of parts, and efficient in operation.

SUMMARY OF THE INVENTION

The present invention provides a rotary internal combustion engine including oval-shaped compression and ignition chambers, a center wall, a first rotor, and a second rotor all centered on a single shaft. The compression chamber has an oval shaped chamber wall and receives fuel for compression. The ignition chamber has an oval shaped chamber wall and receives compressed fuel from the compression chamber and combusts the compressed fuel. The center wall is located between the compression chamber and ignition chamber and allows passage of compressed fuel from the compression chamber to the ignition chamber. The first rotor has a circular perimeter surface and is rotatably received within the compression chamber. The second rotor has a circular perimeter surface and is rotatably received within the ignition chamber. Both rotors have slidable radially extending vanes with center ends that engage the oval shaped walls of the chambers to create operating ignition and compression chamber portions.

DESCRIPTION OF THE PREFERRED EMBODIMENT

Figure 1:
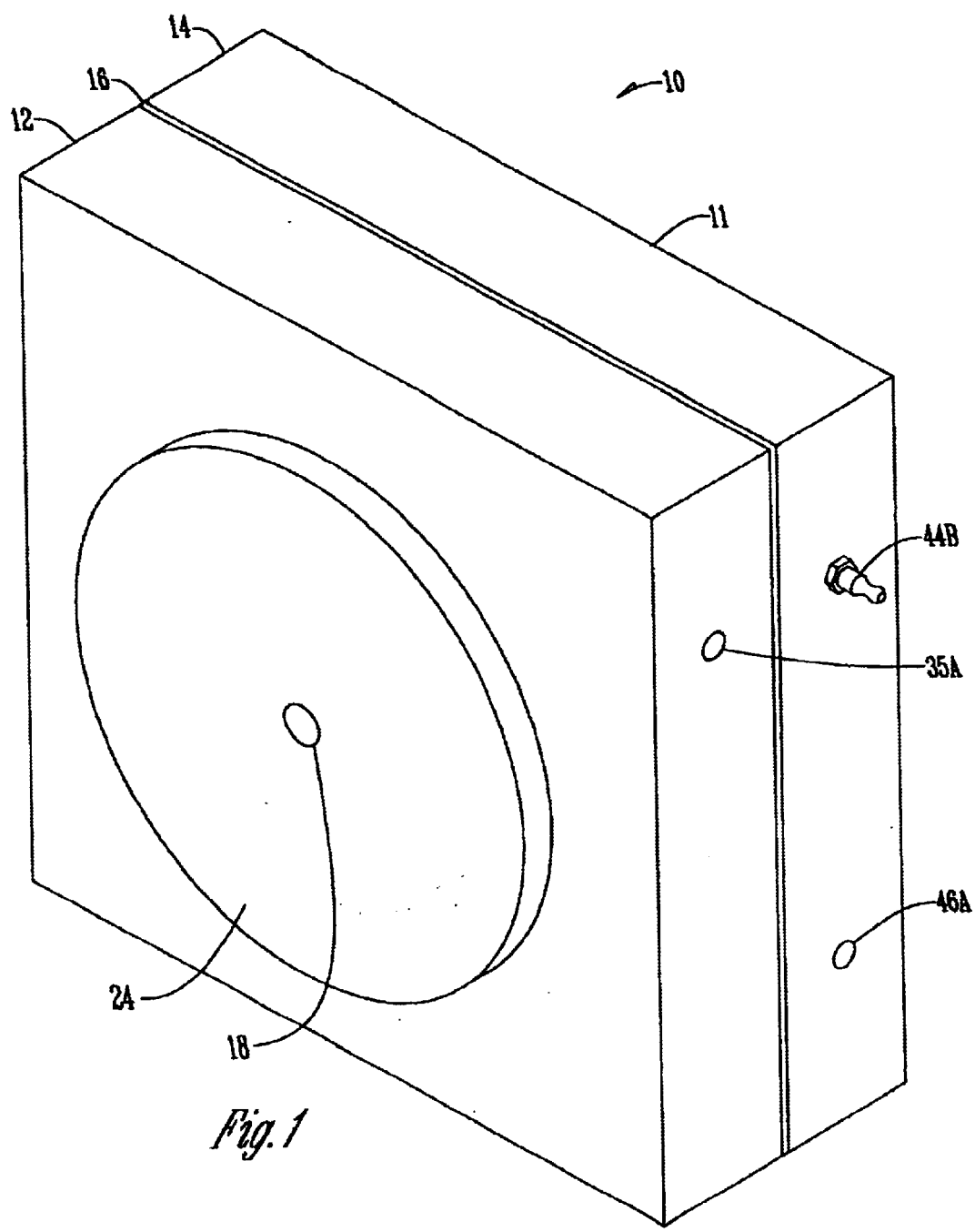
FIG. 1 is a perspective view of the rotary engine of the present invention.

Referring to FIG. 1, there is shown the rotary internal combustion engine 10 of the present invention. The engine 10 has an engine block 11 including a first housing element 12 and a second housing element 14 with a center wall element 16 which is associated between the first and second housing elements 12 and 14.

Figure 4:
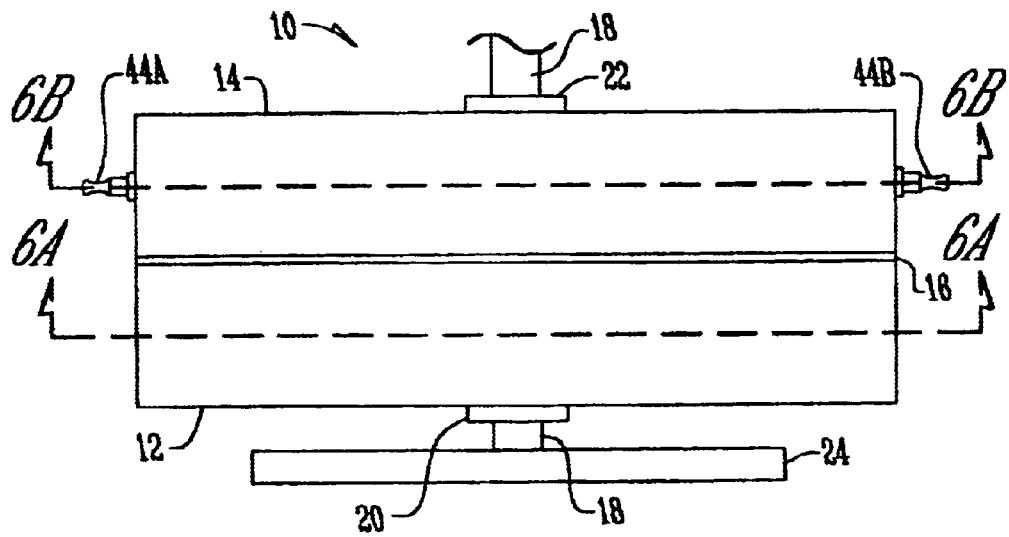
FIG. 4 is a top view of the rotary engine of the present invention.

As shown in FIG. 4, the first and second housing elements 12 and 14 rotatably receive a shaft 18 along the geometric center lines of the first and second housing elements 12 and 14. The shaft 18 passes through the first housing element 12 continuing through the center wall element 16 and then exits through the second housing element 14. A first bearing block 20 rotatably receives the shaft 18 and is located where the shaft passes through the first housing element 12. A second bearing block 22 rotatably receives the shaft 18 and is located where the shaft passes through the second housing element 14. Securely affixed to the portion of the shaft 18 outside of the first housing element 12 is a flywheel 24. The portion of the shaft 18 located outside of the second housing element 14 is connected to any device, not shown, for which engine 10 provides power.

Figure 2:
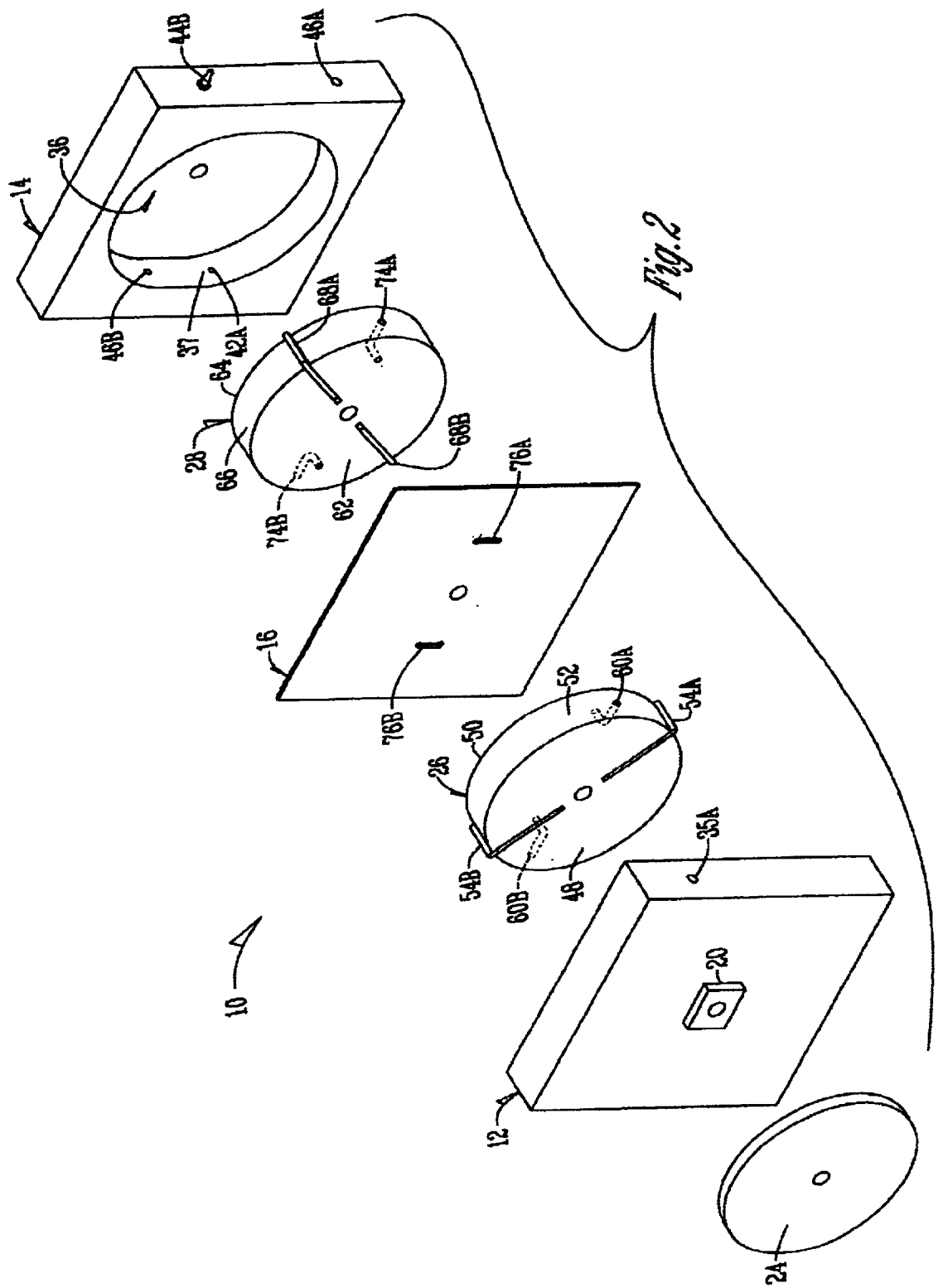
FIG. 2 is an exploded perspective view of the rotary engine with the shaft removed.
Figure 3:
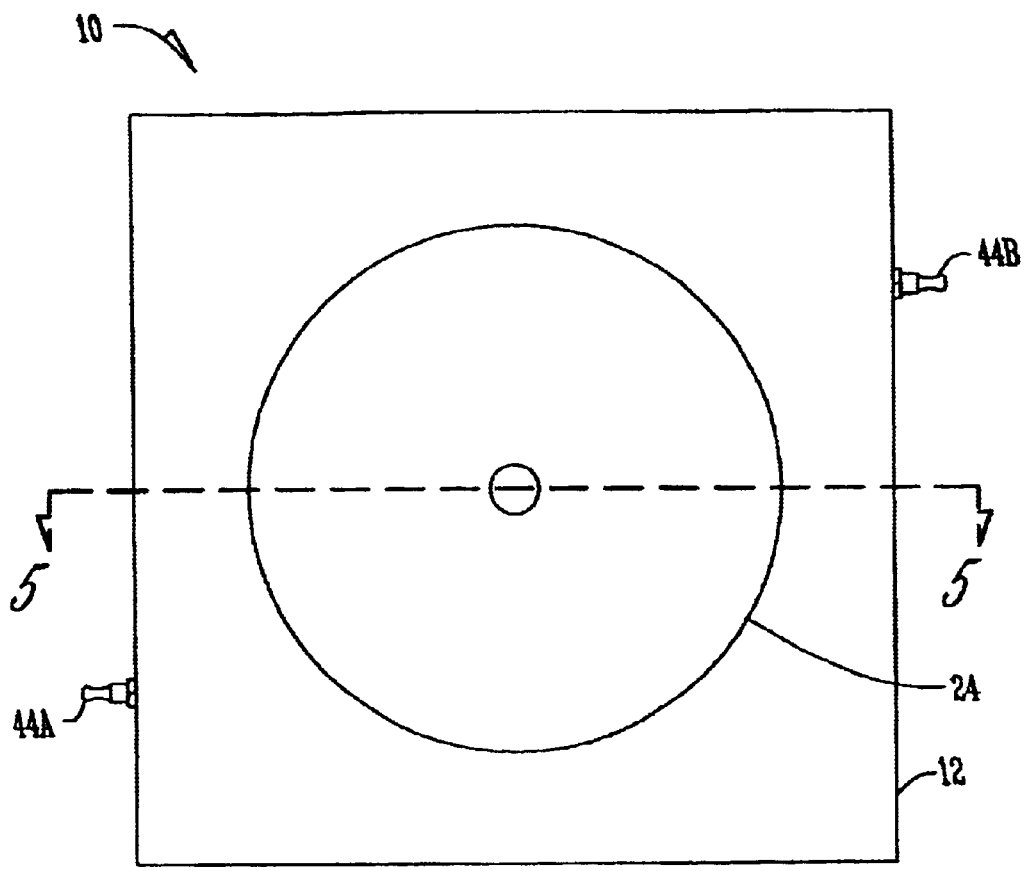
FIG. 3 is a front view of the rotary engine of the present invention.

As shown in FIG. 2, the first housing element 12 rotatably receives a first rotor 26 and the second housing element 14 rotatably receives a second rotor 28. The first and second rotors 26 and 28 are separated by the center wall 16.

Figure 5:
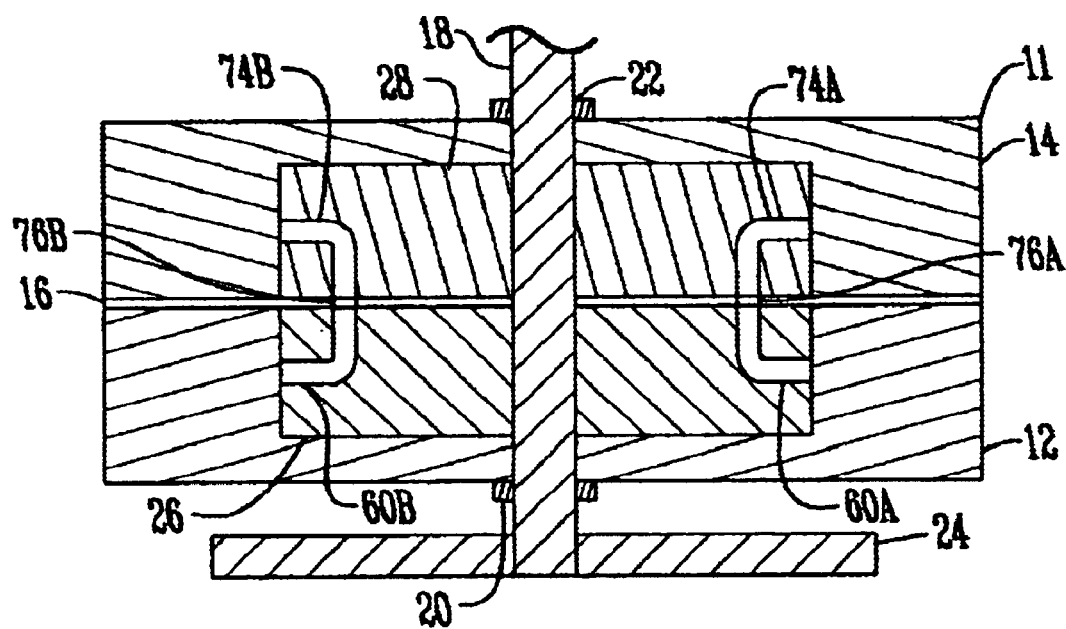
FIG. 5 is a sectional view taken along line 5—5 of FIG. 3.

As shown in FIG. 5, the shaft 18 extends through the rotors 26 and 28 on geometric center lines of the engine block 11. The shaft 18 is fixed to the rotors 26 and 28 while being rotatably mounted to the first and second housing elements 12 and 14 to permit the rotors 26 and 28 and the shaft 18 to rotate with respect to the first and second housing elements 12 and 14.

Figure 6A:
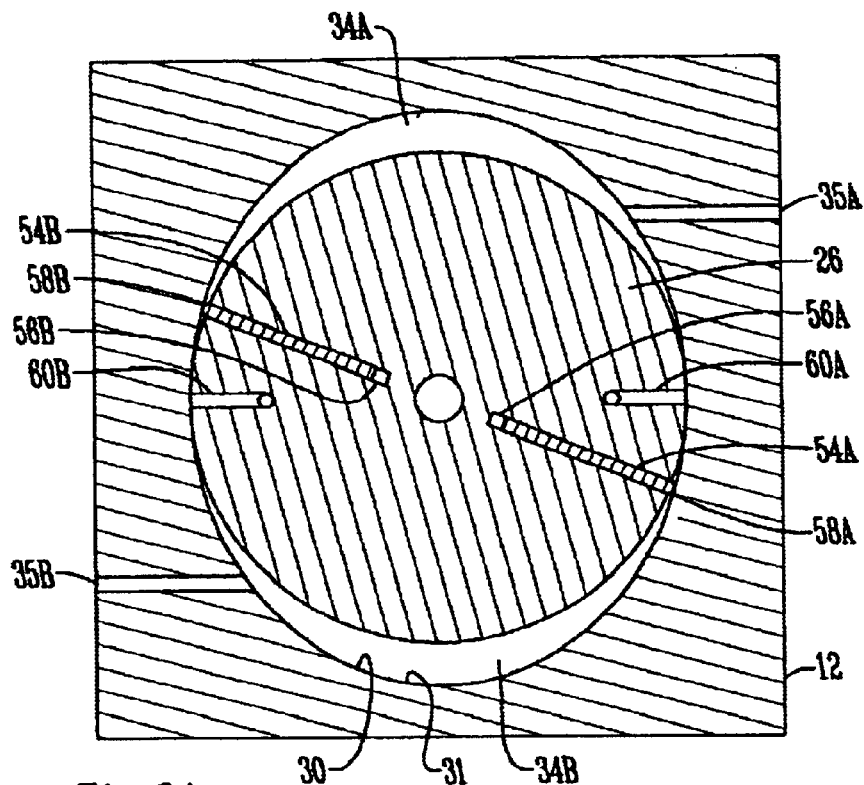
FIG. 6A is a sectional view taken along line 6A—6A of FIG. 4.

As shown in FIGS. 2 and 6A, housing element 12 has an oval-shaped chamber 30 with a vertical major axis and a horizontal minor axis. Circular rotor 26 is centered within chamber 30 and has a diameter slightly less than the minor axis of the chamber 30 and vertically touches the smooth chamber wall 31 having an uninterrupted geometric oval surface at 3 o'clock and 9 o'clock positions to create separate arcuate compartment zones 34A and 34B at 12 o'clock and 6 o'clock positions in chamber 30.

The first housing element 12 also includes at least one fuel inlet port 35A. The embodiment shown here includes a pair of inlet ports 35A and 35B; however, one of ordinary skill in the art will recognize that any number of inlet ports may be provided consistent with the present invention. The inlet port 35A enables the passage of fuel from an outside source (not shown) to the compression chamber 30.

As used herein the term fuel includes but is not limited to combustible fuels, gasoline, diesel, hydrogen gas, mixtures thereof, or mixtures with air. It will be understood that where it is desired to mix fuel with air, the air may be mixed with the fuel outside the engine block 11. Alternatively, it will be understood by those skilled in the art, that the air may be supplied to the compression chamber 30 separated from the fuel, and mixed within the chamber 30. Where the air is supplied separately to the compression chamber 30, fuel may be supplied via additional fuel inlet ports (not shown) in the first housing element 12, while the air is supplied via inlet ports 35A and 35B.

Figure 6B:
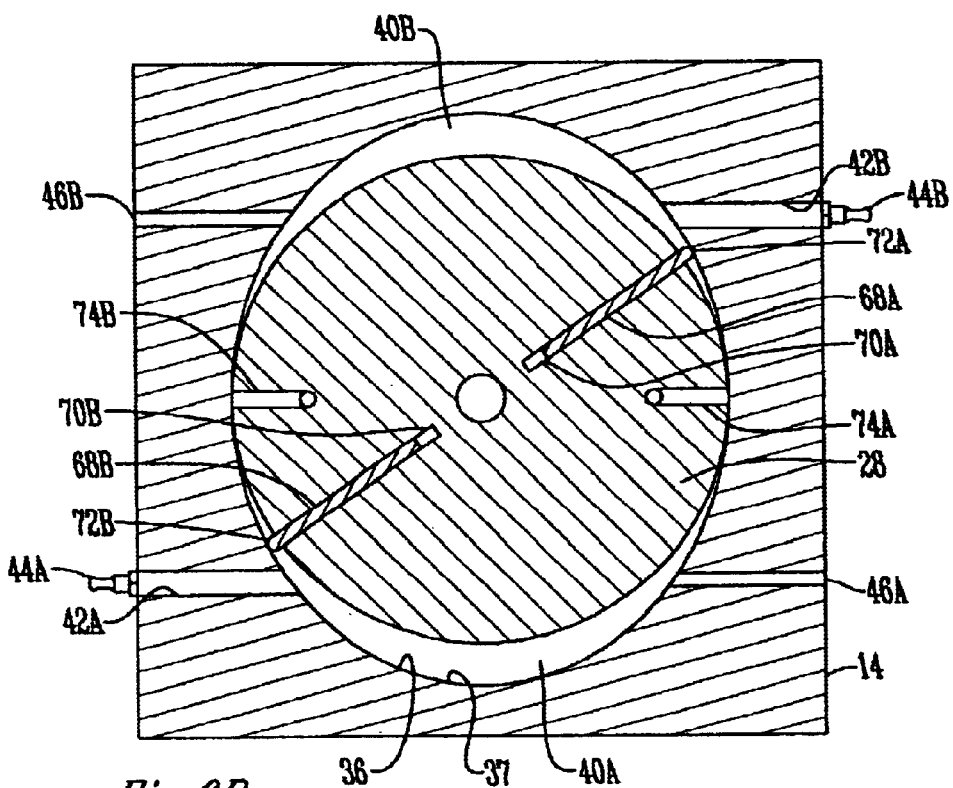
FIG. 6B is a sectional view taken along line 6B—6B of FIG. 4.
Figure 7:
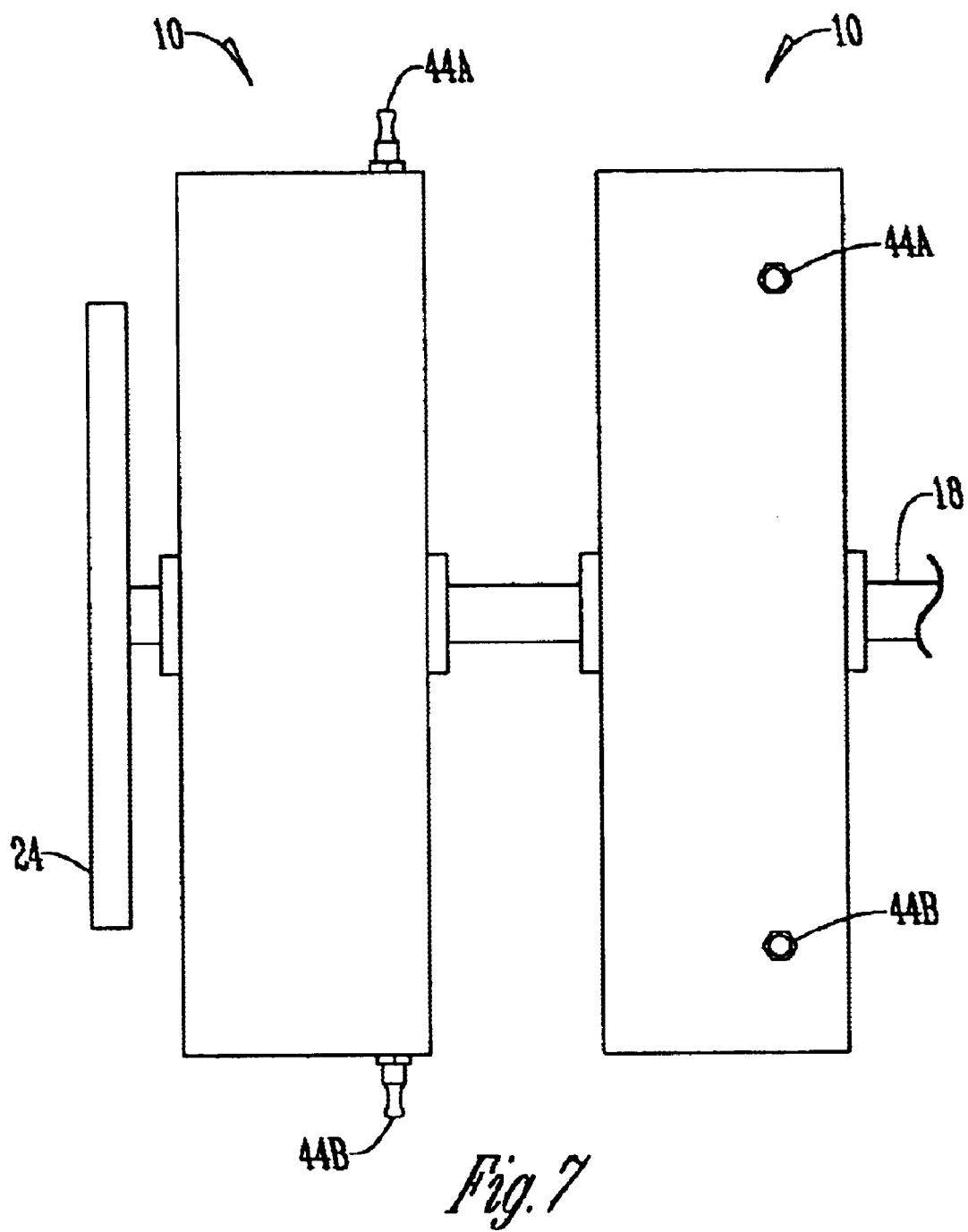
FIG. 7 is a plan side view of a rotary engine.

As shown in FIGS. 2 and 6B, the second housing element 14 has an oval-shaped chamber 36 with a vertical major axis and a horizontal minor axis. Circular rotor 28 is centered within chamber 36 and has a diameter slightly less than the minor axis of the chamber 36 and vertically touches the smooth chamber wall 37 having an uninterrupted oval surface at 3 o'clock and 9 o'clock positions to create separate arcuate compartment zones 40A and 40B at 12 o'clock and 6 o'clock position in chamber 36.

As shown in FIGS. 2, 6A and 6B, the chamber walls 31 and 37 are of similar in size and shape.

The second housing element 14 also includes at least one igniter port 42A. The embodiment shown here includes a pair of igniter ports 42A and 42B; however, one of ordinary skill in the art will recognize that any number of igniter ports may be provided consistent with the present invention. The igniter port 42A enables an ignition mechanism 44A (such as a spark plug) to be operatively associated with the ignition chamber 40 to ignite compressed fuel contained in the ignition chamber 40. It will be understood that where multiple ignition mechanisms 44A and 44B are used, they may be timed to operate together in any manner desired.

The second housing element 14 also includes at least one exhaust port 46A. The embodiment shown here includes a pair of exhaust ports 46A and 46B; however, one of ordinary skill in the art will recognize that any number of exhaust ports may be provided consistent with the present invention. The exhaust port 46A enables the passage of combusted fuel from the ignition chamber 40 out of the engine block 11.

As shown in FIGS. 2 and 6A, the first rotor 26 has first and second sides 48 and 50 opposite to each other and a perimeter surface 52 connecting the sides 48 and 50. The first rotor 26 is rotatably mounted in the compression chamber 30 so that the perimeter surface 52 faces the chamber wall 31 and the second side 50 faces the center wall 16.

The first rotor 26 also includes a pair of oppositely disposed vanes 54A and 54B slidably mounted in radially extended slots 56A and 56B. The vanes 54A and 54B operate so that rotation of the rotor 26 will cause outer ends 58A and 58B of the vanes 54A and 54B to engage the chamber wall 31 to vary the space on opposite sides of the vanes 54A and 54B as they move through the arcuate compartment zones 34A and 34B when the rotor 26 is rotating. It will be understood that while a pair of vanes 54A and 54B have been described here, other numbers of vanes may be provided consistent with the present invention. It will also be understood that, in addition too or as a replacement for centrifugal force maintaining contact between the vanes 54A and 54B with the chamber wall 31, biasing devices may be provided to force the vanes 54A and 54B to contact the chamber wall 31.

The first rotor 26 also includes a pair of fuel injection ports 60A and 60B. The injection ports 60A and 60B are positioned adjacent the vanes 54A and 54B and run from the perimeter surface 52 to the second side 50. The fuel injection ports 60A and 60B permit the flow of fuel from the arcuate compartment zones 34A and 34B to the center wall 16. It will be understood that while a pair of injection ports 60A and 60B have been described here, other numbers of injection ports may be provided consistent with the present invention.

As shown in FIGS. 2 and 6B, the second rotor 28 has first and second sides 62 and 64 opposite to each other and a perimeter surface 66 connecting the sides 62 and 64. The second rotor 28 is rotatably mounted in the ignition chamber 36 so that the perimeter surface 66 faces the chamber wall 37 and the first side 62 faces the center wall 16.

The second rotor 28 also includes a pair of oppositely disposed vanes 68A and 68B slidably mounted in radially extended slots 70A and 70B. The vanes 68A and 68B operate so that rotation of the rotor 28 will cause outer ends 72A and 72B of the vanes 68A and 68B to engage the chamber wall 37 to vary the space on opposite sides of the vanes 68A and 68B as they move through the arcuate compartment zones 40A and 401B when the rotor 28 is rotating. It will be understood that while a pair of vanes 68A and 68B have been described here, other numbers of vanes may be provided consistent with the present invention. It will also be understood that, in addition too or as a replacement for centrifugal force maintaining contact between the vanes 68A and 68B with the chamber wall 37, biasing devices may be provided to force the vanes 68A and 68B to contact the chamber wall 37.

The second rotor 28 also includes a pair of ignition ports 74A and 74B. The fuel ignition ports 74A and 74B are positioned adjacent the vanes 68A and 68B and run from the first side 62 to the perimeter surface 66. The ignition ports 74A and 74B permit the flow of compressed fuel from the center wall 16 to the arcuate compartment zones 40A and 40B. It will be understood that while a pair of ignition ports 74A and 74B have been described here, other numbers of ignition ports may be provided consistent with the present invention.

As shown in FIGS. 2 and 5, the center wall 16 includes a pair of transfer ports 76A and 76B. The transfer ports 76A and 76B are located to be intermittently associated with both the fuel injection ports 60A and 60B and the ignition ports 74A and 74B. The transfer ports 76A and 76B are adapted to register with the fuel injection ports 60A and 60B to permit compressed fuel to move from the first rotor 26 to the ignition ports 74A and 74B of the second rotor 28 when all the ports are aligned. It will be understood that while a pair of transfer ports 76A and 76B have been described here, other numbers of transfer ports may be provided consistent with the present invention.

It will be understood that more than one rotary engine 10 of the present invention may used in series along the same axis of rotation. Where one engine 10 is used, power is supplied every 90 degrees of rotation. Where two engines 10 are used, power is supplied every 60 degrees, and so on.

Referring to FIGS. 5, 6A, and 6B, in operation the shaft 18 is initially turned with a starter motor or hand crank (not shown). An ignition switch coupling a source of electric power (not shown) such as a battery, to an ignition control circuit (not shown), is turned on to supply electrical power to igniters 44A and 44B. The electrical control circuit operates in timed relation with the rotation of shaft 18 to supply electric power to the igniters 44A and 44B thereby igniting the fuel in the ignition chamber 36. The rotary internal combustion engine 10, draws in fuel through the fuel inlet ports 35A and 35B and into the arcuate compartment zones 34A and 34B. The rotation of the vanes 54A and 54B throughout the arcuate compartment zones 34A and 34B operates to compress the fuel in the fuel injection ports 60A and 60B. When the rotation brings the fuel injection ports 60A and 60B into alignment with the transfer ports 76A and 76B, the fuel is at full compression. The compressed fuel is then passed from the fuel injection ports 60A and 60B, through the transfer ports 76A and 76B, into the ignition ports 74A and 74B. As the second rotor 28 continues to rotate, the vanes 68A and 68B pass over the igniter ports 42A and 42B, and the compressed fuel in the ignition ports 74A and 74B partially expand into the portion of the arcuate compartment zones 40A and 40B located behind the vanes 68A and 68B. The fuel is then ignited by the ignition mechanisms 44A and 44B imposing rotational forces on the second rotor via vanes 68A and 68B to impart rotational motion to the shaft. As the vanes 68A and 68B pass the exhaust ports 46A and 46B, the combusted gas is expelled from the ignition chamber 40 via the exhaust ports 46A and 46B, and the cycle is repeated.

It is therefore seen that the present invention provides a rotary engine that is efficient of manufacture and use, easily operated, easily maintained, comprised of a minimum of parts, and efficient in operation.

It is therefore seen that this invention will accomplish at least all of its stated objectives.

We claim:

1. A rotary internal combustion engine, comprising:

a compression chamber having a smooth chamber wall adapted to receive fuel and compress the fuel;

an ignition chamber having a smooth chamber wall adapted to receive compressed fuel from the compression chamber and combust the compressed fuel;

a center wall between the compression chamber and ignition chamber adapted to allow passage of compressed fuel from the compression chamber to the ignition chamber;

a shaft being concentrically disposed and extending through the compression chamber, the ignition chamber and the center wall;

the compression chamber having an oval shape and a first rotor therein creating a first and second arcuate compression compartment zones; and timed ignition elements in communication with the arcuate compression compartment zones.

2. The apparatus of claim 1 further comprising a second rotor rotatably received within the ignition chamber.

3. The apparatus of claim 2, wherein each rotor has a vane slidably mounted in a radially extended slot so that rotation of the rotors causes outer ends of the vane to engage the chambers to vary the space on opposite sides of the vane when the rotors are rotating.

4. The apparatus of claim 2, further comprising a transfer port in the center wall adapted to permit compressed fuel to move from the first rotor to the second rotor, and wherein the first rotor includes a fuel injection port for permitting the flow of fuel from the compression chamber to the transfer port.

5. The apparatus of claim 2, further comprising a transfer port in the center wall adapted to permit compressed fuel to move from the first rotor to the second rotor, and wherein an ignition port in the second rotor conveys fuel from the transfer port to the ignition chamber.

6. The apparatus of claim 1, further comprising a transfer port in the center wall adapted to permit compressed fuel to move from the compression chamber into the ignition chamber.

7. The apparatus of claim 1, wherein a plurality of the rotary internal combustion engines are used in series along the same axis of rotation.

8. A rotary internal combustion engine, comprising:

a compression chamber having a smooth chamber wall adapted to receive fuel and compress the fuel;

an ignition chamber having a smooth chamber wall adapted to receive compressed fuel from the compression chamber and combust the compressed fuel, the ignition chamber being in alignment with the compression chamber;

a center wall between the compression chamber and ignition chamber adapted to allow passage of compressed fuel from the compression chamber to the ignition chamber;

a shaft being disposed concentrically and extending through the compression chamber, the ignition chamber and the center wall;

the compression chamber having an oval shaped chamber wall;

the ignition chamber having an oval shaped chamber wall;

a first rotor having a circular perimeter surface rotatably received within the compression chamber creating arcuate compression compartment zones with the oval shaped chamber wall of the compression chamber;

a second rotor having a circular perimeter surface rotatably received within the ignition chamber;

a pair of oppositely disposed vanes slidably mounted in radially extended slots in each of the rotors so that rotation of the rotors will cause outer ends of the vanes to engage the surfaces of the oval-shaped chamber walls to vary the space on opposite sides of the vanes as they move through the arcuate compression compartment zones when the rotors are rotating; and fuel injection ports adjacent the vanes on the rotor in the compression chamber for permitting the flow of fuel from the perimeter of the first rotor to a surface thereof adjacent the center section.

9. The apparatus of claim 8, wherein the oval shaped chamber walls have arcuate compartment zones between perimeter surfaces of the rotors and the lengthwise ends.

10. The apparatus of claim 8, further comprising transfer ports in the center wall adapted to permit compressed fuel to move from the compression chamber into the ignition chamber.

11. The apparatus of claim 10, wherein the first rotor includes fuel injection ports for permitting the flow of fuel from the compression chamber to the transfer ports.

12. The apparatus of claim 10, wherein ignition ports in the second rotor to convey fuel from the transfer ports to the ignition chamber.

* * * * *